350-6.5         SR
OR    3,601,467

T3024N

[11] 3,601,467

[72] Inventor
[21] Appl. No.
[22] Filed     Apr. 1, 1969
[45] Patented  Aug. 24, 1971
              Continuation-in-part of application Ser. No.
              804,080, Mar. 4, 1969, now abandoned.

[54] OPTICAL SCANNING ARRANGEMENT
     11 Claims, 19 Drawing Figs.
[52] U.S. Cl. .................................................. 350/6,
                       95/4.5, 178/7.6, 356/25
[51] Int. Cl. ........................................................ G02b 17/00
[50] Field of Search ............................................ 350/6, 7,
              273-275, 285; 250/219, 235, 236; 178/7.6;
              356/23-26; 73/5, 6; 352/84, 114-118; 95/4.5;
                                                           340/146.3

[56]              References Cited
              UNITED STATES PATENTS
2,323,512   7/1943   Bamford ........................   352/115 igonnet et al. .............   95/4.5
          igonnet et al. .............   95/4.5
          twood .......................   350/7
          FOREIGN PATENTS
347,502   10/1920   Germany .....................   352/117

Primary Examiner—David Schonberg
Assistant Examiner—Michael J. Tokar
Attorney—B. Edward Shlesinger ABSTRACT: The entire area of a single character is simultaneously illuminated, and the illuminated area is displaced along a scanning line that contains further characters. Images are formed adjacent a common point of the strung out characters. The characters are preferably made up of two elements of a limited number of elements. The rays of the images of the two character elements formed adjacent said common point are guided in different directions. They are compared simultaneously with all elements in use.

A straight scanning line may be attained with a concave and preferably cylindrical mirror.

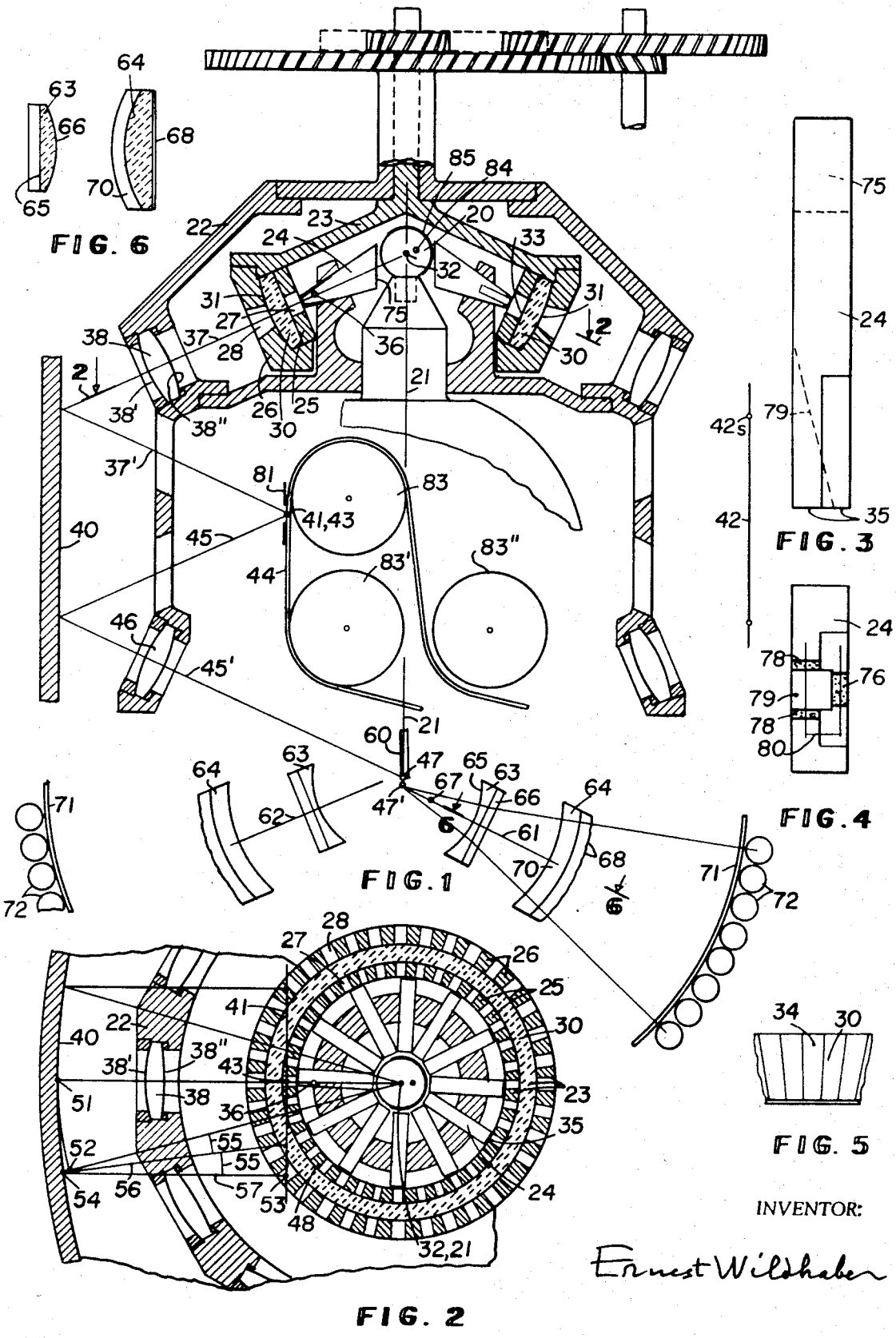

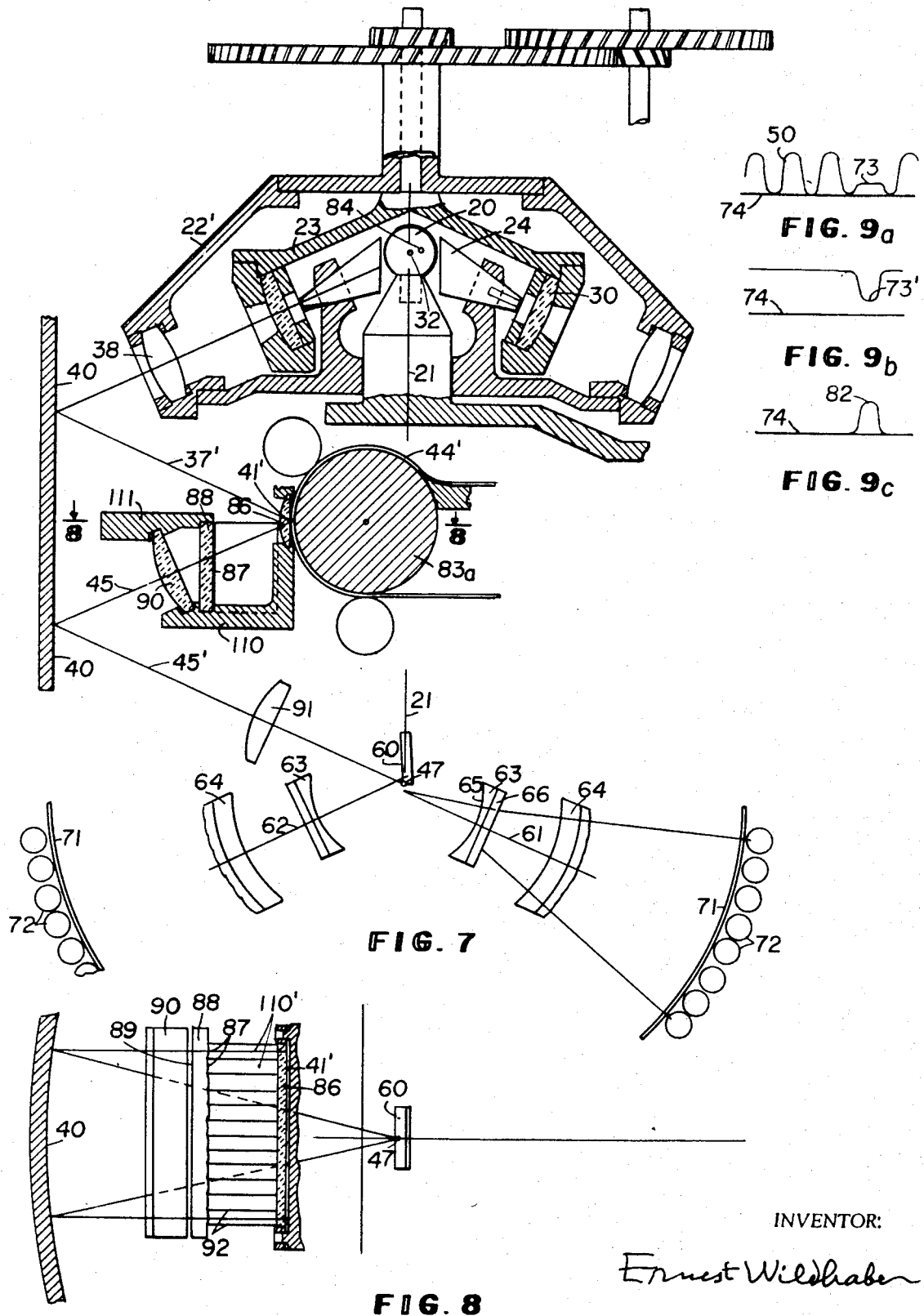

PATENTED AUG 24 1971 3,601,467

INVENTOR:
Ernest Wildhaber

OPTICAL SCANNING ARRANGEMENT

This application is a continuation-in-part of my copending application, Ser. No. 804,080, filed Mar. 4, 1969, now abandoned.

The purpose of the present invention is high speed of operation and simplicity of design.

One of its objects is to devise an improvement of the scanning disposition described in my copending application, Ser. No. 793,851 filed Jan. 24, 1969.

The fastest way of scanning is to recognize an entire character at once, rather than splitting it up into a plurality of points. A main object is to make this simplest method reliable. To this end I light the entire area of a single character and may maintain this lighted area substantially stationary on the character for an instant, to gather the complete picture without changes during said instant. The lighted area is displaced stepwise from character to character, barring passage of light during the step itself. The characters can then be set close together.

To this end also I may provide a small group of simple elements, and make up all characters with two of said elements. The invention aims to identify both elements of such a character simultaneously. For reliability the different elements of said group may all occupy different portions of the total space reserved for the element, so that there is no overlap between them.

A further aim is to provide an arrangement using a straight scanning line.

Photocells are used for comparing a lighted character with the patterns of a master. A further aim is to achieve simplified electric current and a distinctive current fluctuation in the photocells at match, even when the illumination pulsates.

Some embodiments of the invention use an individual lens surface for each character of the scanning line. The width of these lens surfaces is limited by the spacing of the characters. A further object is to increase the light transmitted therethrough by using nonspherical lenses, such as cylindrical lenses that are much higher than wide.

Other aims will appear in the course of the specification and in the recital of the appended claims.

Several embodiments use a pair of rotors carrying lenses.

FIG. 1 is a diagrammatic axial section showing one embodiment of the invention.

FIG. 2 is a fragmentary section taken along lines 2—2 of FIG. 1 looking in the axial direction of the arrows.

FIG. 3 is an enlarged view of one of the light-pipes 24 shown in FIGS. 1 and 2, looking at its narrow side.

FIG. 4 is a front view thereof.

FIG. 5 is a fragmentary radial view of the refractory ring 30, looking outwardly from the inside.

FIG. 6 is a section taken along lines 6—6 of FIG. 1, of the refractory members 63 and 64.

FIG. 7 is a diagrammatic axial section showing a modified embodiment of the invention.

FIG. 8 is a cross section taken along lines 8—8 of FIG. 7, omitting part 111.

FIG. 9a is a diagram showing current fluctuations in photocells at pulsating illumination intensity.

FIG. 9b shows the current obtained with dual lighting of the photocells.

FIG. 9c shows the current when a negative record is used.

Figure 10:

FIG. 10 shows a small group or different character elements, as may be used with the described scanning arrangement.

Figure 11:
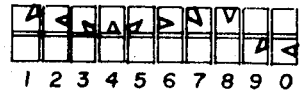

FIG. 11 shows numbers made up by pairs of such elements.

FIGS. 12a, 12b, 12c, 12d show letters made up by pairs of such elements.

Figure 13:
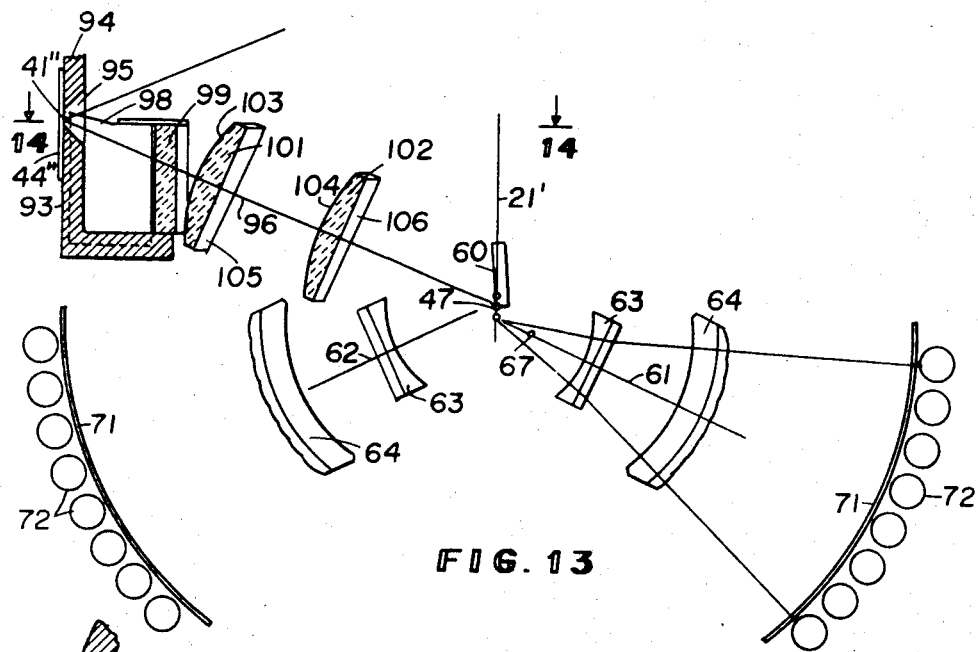

FIG. 13 is a fragmentary sectional view describing a further embodiment.

Figure 14:
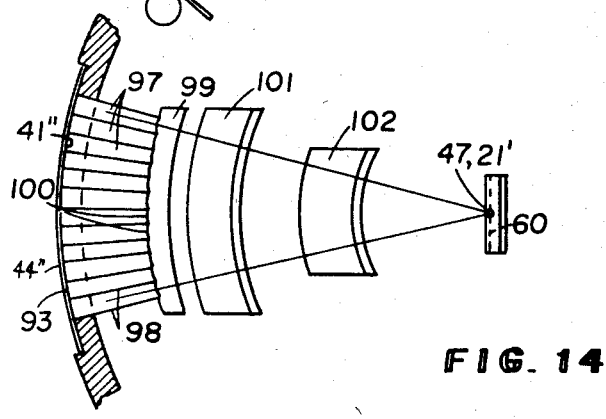

FIG. 14 is a section taken along lines 14—14 of FIG. 13.

In FIGS. 1 and 2, a source of light 20 is set on or adjacent the axis 21 of a pair of coaxial rotors 22, 23. The outer rotor 22 carries light-pipes 24 uniformly spaced about its axis, for directing light away from source 20. The inner rotor carries a metal inner ring 25 and a metal outer ring 26 provided with light openings 27, 28 respectively, for letting light pass through and to periodically shut it off. The two metal rings 25, 26 straddle a refractory ring 30. Ring 30 has a spherical outside surface 31 centered at 32 on axis 21. Its inside surface 33 contains a large number of plane facets enveloping a conical surface. The light channels 27, 28 and the facets are aligned with each other. The facets do not show up in FIG. 2, but appear at 34 in FIG. 5. An opaque ribbon (not shown) follows the juncture between facets. Each facet, together with a portion of the spherical outside surface 31, constitutes an individual lens. It forms a virtual image centered at 36 of the outer end 35 of light-pipe 24. Light follows a path 37, passes through a lens 38 carried by outer rotor 22 and is reflected at concave mirror surface 40 to a path 37' and to the scanning line 41. The mirror surface is part of a cylindrical surface whose axis 42 is parallel to rotor axis 21. It could also be a spherical surface centered at 42s. Surface 40 has a distance 21-51 (FIG. 2) from axis 21. The radius of the cylindrical surface is double said distance.

Lens 38 (or lens system) is proportioned to form an image of virtual point 36 on the scanning line 41 of record 44, together with mirror 40. Because the cylindrical mirror is concave in peripheral direction and straight in the axial plane of FIG. 1, this difference has to be made up on lens 38. Its outside surface 38' may be spherical, but then its inner surface 38" is nonspherical. It is less curved in peripheral direction (FIG. 2) than in an axial section, (FIG. 1).

The record diffuses and reflects the light in a general direction 45 back to mirror surface 40. Thence it is reflected in direction 45' towards axis 21 of the rotors, passing through a lens 46 of rotor 22. The light path 45, 45' is the mirror image of light path 37', 37 with respect to a plane perpendicular to axis 21. Suitable large openings are provided on rotor 22 for the paths 37', 45.

Lens 46 is similar to lens 38. It is proportioned to form an image of point 43 (FIG. 1) at point 47 on axis 21, together with mirror 40. Point 47 is independent of the position of the scanned point on line 41. It is a common point for all positions. Each illuminated character of the record has its image adjacent common point 47. The center of the image is at 47.

If the two rotors 22, 23 were fixed to one another, the illuminated area would uniformly move along the scanning line on uniform rotation of the rotors. Different rotations of the two rotors however affect the position of the lighted area. A suitable speed proportion between the two rotors displaces the lighted area stepwise to arrest it briefly on a character and to make it jump from character to character. Light is shut off during the jump itself by the opaque portions 48 between light channels 27 of inner ring 25.

As light does not sweep laterally over a character, starting on one side and ending at the other side, but keeps on the full character during the light period, an image of the full character only is transmitted for comparison. The comparison is therefore safer than with a uniform sweep.

It can be shown that the inner rotor 23 should run much faster than the outer rotor 22 and in the opposite direction. As the outer rotor turns through one pitch between lenses 38, here through one twelfth of a turn, the inner rotor turns relatively thereto through as many individual lenses 34 of ring 30 as there are characters on the scanned line 41. The required pitch of the individual lenses can be determined with the known procedures of optics, or as described in the above-named patent application, to which reference is made.

DISPOSITION OF MIRROR AND SCANNING LINE

As light is shut off at equal turning intervals, these should correspond to equal displacements of the lighted area on the scanning line, to match the constant spacing of the characters. The arc between central point 51 and any point 52 (FIG. 2) at the same radial distance from axis 21 should equal the distance between central scanning point 43 and the corresponding center 53 of the illuminated area.

The position of any point 53 can be readily computed. In FIG. 2 a radial ray 21–52 intersects the circular profile of cylindrical surface 40 at 54. It is inclined in this view at an angle 55 to the surface normal 56, that is to the radius of the cylindrical mirror surface 40. The reflected ray 57 is equally inclined to normal 56. It intersects the scanning line at 53.

Let $i$ denote the inclination of normal 56 to central line 21–51, R the radius 21–51, 2 R the radius of the cylindrical surface 40, then the turning angle 51–21–52 may be computed by $$\tan \theta = \frac{2R \sin i}{R(2 \cos i - 1)} = \frac{2 \sin i}{(2 \cos i - 1)}$$

And with $b$ denoting the distance 21–43 of the scanning line 41 from axis 21, distance $x$=43–53 becomes $$x = R\left[ 2 \sin i - \left\{ (2 \cos i - 1) - \frac{b}{R} \right\} \tan (2i - \theta) \right]$$

The difference of the above amount $x$ from $R$ arc $\theta$ is the departure from uniformity. In the embodiments illustrated the end of the scanning line corresponds to $i$=7½°. At $R$=15" this provides a total length of the scanning line of 2 $x$=7.8". The departure from uniformity then amounts to 0.0003" at $b/R$=⅓ as shown. This is negligible. It would be 0.0106 at $b/R$=0.

The departures are smaller at lesser angles $i$, that is at smaller distances from the center 43 of the scanning line.

The shown disposition also satisfies the requirement that the scanning line be straight and not curved. A straight scanning line requires the points 43, 53 to lie in the same plane perpendicular to axis 21. Computation shows that this requirement is fulfilled for all practical purposes. In the above numerical example and at the shown inclination of the central rays the maximum departure from said plane containing point 43 amounts to 0.001", well within tolerances. It occurs at the end point 53 of the scanning line.

SYMBOLS

Symbols may be used to transmit signals and information. They can be better shaped for the machine than letters, whose basic shape gives no consideration to machines. It is desirable to make a fresh start rather than a mere adaptation.

The here described symbols are made up of two elements of a small group of different elements.

FIG. 10 shows an embodiment of such elements. Each is inscribed into a square. The cross-hatched portions are similar to the hands of a clock. They may be solid black on white, or transparent on an opaque square. The shown group contains eight elements. They permit 64 combinations of two elements, plus twice times eight when leaving one of the two elements blank, a total of 80 different signals.

FIG. 11 shows a way of representing numbers with these elements. Cross-hatching is here omitted for convenience.

Figure 12A:
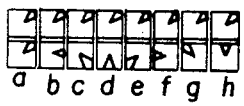
Figure 12B:
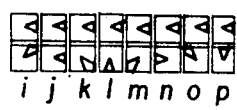
Figure 12C:
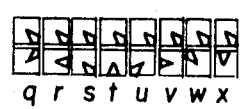
Figure 12D:
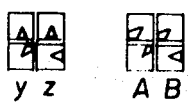

FIG. 12a shows a way of representing the first eight letters of the alphabet, from a to h. FIG. 12b shows the second eight letters, from i to p. FIG. 12c shows the letters from q to x. FIG. 12d shows the letters y and z and at the right the capital letters A and B. As there is no overlap whatsoever between the marks of any two superimposed symbols, transmitted light is either on or off, without intermediate steps. This adds to the reliability.

The invention provides means for reading both elements of a symbol simultaneously. Plane-sided mirror 60 (FIG. 1) reaches to central point 47 and has its lower edge extending along the borderline between the two projected elements of the symbols. The image of the lower projected element is unaffected by the mirror. Its rays pass on in a general direction 61. The entire image of the upper projected element however is reflected by mirror 60, so that its rays go in a general direction 62. Each of the two ray bundles pass through a lens 63 and then through a multifaced lens 64, both shown also in FIG. 6. Lens 63 contains a concave cylindrical surface 65 facing point 47 on a convex cylindrical surface at right angles thereto on the opposite side. It can be considered composed of a cylindrical lens with concave surface 65 on one side and a plane on the opposite side, set across the first component lens. The former increases the angular spread of the light bundle i the plane of FIG. 1 and forms a virtual image of mean point 47' at point 67. Lens 64 contains a plurality of convex cylindrical surface portions 68 arranged in an arc about point 67, one for each element of the group of eight. Individual surfaces 68 are parallel to each other and are arranged side by side. They are higher than wide. The opposite side of lens 64 is a toroid surface 70. It is concave in the view of FIG. 1 and has a convex circular profile in the plane at right angles thereto, as shown in FIG. 6.

More broadly lens 64 contains a plurality of nonspherical surfaces arranged side by side. They are more curved and narrower from side to side than at right angles thereto, in the direction of their height.

The first-named component lens and the individual lens surfaces 68 are proportioned to form images of point 47' on a master 71, in the view of FIG. 1, as many images as there are lens surfaces 68. Similarly the lens profiles in plane 6—6 are proportioned to form an image of point 47' on master 71. The combined effect are a group of images formed on master 71.

For records containing black or dark symbols on white or light ground, an opaque master contains the elements of the group as transparencies, for instance punched out, a different element occupying each image position. A photocell 72 is set back of the master at each element thereof.

Light will pass through the master unless the projected image matches the element of the master. A match blocks light passage, so that the element of the record is identified by the element position on the master. The lower element of a projected symbol is identified by the photocells shown at the right in FIG. 1, the upper projected element by the photocell group at left. The symbol itself is identified by the element positions in the two groups.

Lack of light stops or decreases the electric output current passing through the photocell. As light passage is periodically shutoff by portions 48 the current fluctuates, as shown by the undulating curve 50 at the left of FIG. 9a. Portion 73 at the right indicates a match. The base line 74 describes zero current.

The invention also provides means for avoiding the periodical stopping of current, so that the current corresponds about to FIG. 9b. Dip 73' signifies a match. Such a current simplifies circuitry and increases reliability. It is obtained by exposing the photocells to further periodic light with a phase difference of half a cycle as compared with the light received from the record.

The Light-Pipes

The shown tapered light pipe 24 has a rectangular cross section and has its large end surface 75 placed close to the light source 20. At its forward end 35 it has an area 76, shown with dots for recognition. Area 76 corresponds to and is mathematically similar to the rectangular space occupied by a single symbol or character, for instance by a described pair of elements. Area 76 is projected to the record 44 as the illuminated area thereof. If it were the complete end 35 of the light-pipe, it would cause an electric current as shown in FIG. 9a. It contains however also a pair of areas 78 that have a larger distance from each other than the height of area 76. The distance is produced by a tapered cutout 79. The center of areas 78 is laterally spaced a distance 80 from the center of surface 76. Distance 80 equals half a pitch of the light channels 27, measured at the end adjacent the light-pipe. When a facet 34 and its lens are aligned with area 76, light from areas 78 is blocked off by the wall 48 between light channels 27, while light from area 76 is transmitted. And when the center of areas 78 is aligned with a light channel 27, light from surface area 76 is blocked off, while light from areas 78 is transmitted. Light from areas 78 reaches the white or light front surface of a thin plate 81 placed directly in front of the scanning line 41, while light from area 76 passes through a slot in plate 81 to the record 44. Light from both sources reach each photocell 72. As the combined light supply is now more nearly constant on the photocells where no match is attained, the resulting current corresponds approximately to FIG. 9b.

In case the record is negative and shows the characters as transparencies in an opaque field, the areas 78 are unnecessary. Using symbols without overlap, light is only transmitted to a photocell when a match is attained. The electric current then corresponds to FIG. 9c. Peak 82 signifies match.

The record 44 is constrained to move in a plane at the scanning line 41 by known means. It may be fed uniformly over rollers 83, 83,, 83,, with conventional sprockets that engage holes provided adjacent the record sides. A pair of belts covering the zones adjacent said holes may be used, if desired, to guide the record, in addition to stationary guides.

The lines of characters of the record are inclined to the scanning line just so much, that opposite ends of adjacent lines are approximately on the scanning line. If the axes of the rollers 83, 83', 83'' are perpendicular to the plane of FIG. 1 this would require the lines of characters to be slightly slanted to lines perpendicular to the sides of the record.

Lines perpendicular to the record sides can be used by tilting the roller axes, so that the axes appear as vertical lines in FIG. 1. In other words, the record feed is then slightly inclined to the drawing plane of FIG. 1. This corresponds to FIG. 12 of the above cited patent application.

The shown source of light 20 has its filament offset from the center of the bulb. It is centered at 84. And part of the bulb is provided with a mirror surface 85 facing inwardly. These provisions are for throwing more light forward into the active light-pipe 24.

EMBODIMENT OF FIGS. 7 AND 8

This modification retains many of the described features, particularly the top portion and the bottom portion of FIG. 1. Identical parts are denoted with the same numerals.

The pair of coaxial rotors 22', 23 are timed to rotate at different speeds in opposite directions by gears, just like the rotors 22, 23 of FIG. 1. Rotor 22' has its top part identical with rotor 22 of FIG. 1. Rotor 22' is shorter axially. It contains the lenses 38 but not the lenses 46. The record 44' here remains on a roller 83a, and does not need to move in a plane at the scanning line 41'. To allow for the curvature of the roller, a cylindrical lens 86 is used adjacent the scanning line. Because of its proximity it does not materially change the illuminated area on the record. It may be parallel to the roller axis. The uniform feed of the record may be in a direction inclined to the plane of FIG. 7, as described in connection with FIG. 1.

The light bundle is principally reflected from record 44' in the general direction 45. An individual channel 110' (FIG. 8) is provided for the rays coming from each character. The rays pass through individual convex cylindrical lens surfaces 87 of a stationary refractory plate 88 having a plane rear side 89. Thence they pass through a cylindrical lens 90 to concave mirror surface 40. The cylindrical lens could also be set at right angles to path 45 instead of parallel to axis 21. The rays are reflected in a general direction 45' and pass through a cylindrical lens 91 to a common point 47. Plate 88 and lens 90 are held in place by stationary parts 110, 111.

The individual cylindrical lens surfaces 87 are proportioned to form an image of the illuminated character at and adjacent 47 on axis 21, together with the concave cylindrical mirror surface 40. Likewise the cylindrical lenses 90, 91 are proportioned to form an image of the illuminated character at and adjacent common point 47. The image formed at point 47 does not need to have the same proportion of width and height as the character of the record.

From point 47 on the disposition is the same as already described with FIG. 1. Mirror 60 splits up the rays of the projected upper element from those of the lower projected element, to follow a general path 62 and 61 respectively. The rays of each pass through a lens 63 and a composite lens 64 to a master 71. The master contains all the elements of the group marked thereon, for comparison with the lighted element. Photocells 72 are placed back of the master adjacent to its markings.

It should be noted that stationary lens surfaces and lenses are here substituted for the rotating lenses 46 of the previous embodiment. As the individual lens surfaces 87 have a restricted width, their height is made much larger than their width to favor the light volume passing through, the width being measured in the direction of the scanning line 41'. The lens surfaces 87 are preferably cylindrical surfaces whose straight line elements extend in a direction perpendicular to the scanning line. More broadly, the individual lens surfaces 87 are more curved in the direction of their width than in the direction of their height, the latter extending at right angles to the width. The lens surfaces 87 lie on a common refractory element or plate 88 placed at one end of the opaque separating sheets of the light channels 110', at the end furthest away from the scanning line. These sheets 92 are black and light-absorbent. The rear side of lens 86 is covered with a bright reflecting layer except for the scanning width.

EMBODIMENT OF FIGS. 13 AND 14

In this embodiment the record 44'' is fed uniformly at a small angle to the axis 21' of a cylindrical surface 93, as described in the named patent application. The angle is such that opposite ends of adjacent character lines are close to the ends of the scanning line. Surface 93 is the outside surface of a metal part 94 that contains a peripheral slot 95 for the scanning line 41'' and the area following it. The record is bent to follow surface 93 in the vicinity of the scanning line. Light or broadly radiant energy is projected to the area of a single character, and is then displaced along the length of the scanning line, so as to illuminate only a single character at a time.

Intermittent or continuous illumination may be used. In the latter case the characters have to be spaced further apart to avoid simultaneous illumination of two characters at a time. Displacement of the lighted area may be effected with rotors or in any other known way, as is done for instance in television.

The light is reflected from the record in a general direction 96 into individual light channels 97, one for each character of the scanning line. Channels 97 are separated by black sheets 98. A refractory member 99 is placed at the end of the sheets 98. It contains convex cylindrical lens surfaces 100 arranged in an arc about axis 21', one for each light channel 97.

The lens surfaces 100 and arcuate lenses 101, 102 are proportioned to form an image of each illuminated character adjacent a common point 47 on axis 21'. Lenses 101, 102 have convex outer profiles. Their outer surfaces 103, 104 can be made spherical surfaces. Their inner surfaces 105, 106 are conical surfaces extending about axis 21'. Also other forms of lenses may be used to the described effect.

From here on the already described structure is used. Mirror 60 splits up the image centered at point 47 and projects the rays of the upper image part in a general direction 62, while the rays of the lower image part continue in a general direction 61. The rays pass through a lens 63 and composite lens 64 to a master 71 and to photocells 72.

In other embodiments similar to those described and not illustrated, a light-absorbent sheet is placed on the reflecting surface of mirror 60 to cover said surface and a portion below it. It has a cutout for the width of the character image formed adjacent point 47 and absorbs all rays outside of it. This sheet may be used together with or even without the separating sheets 92, FIG. 8, and 98, FIG. 14.

If desired, known provisions may be made to check the alignment of the characters and to correct it if required.

I claim:

1. Optical scanning arrangement for scanning characters arranged in a line on a record, said arrangement comprising means for illuminating the whole area of a single character without infringing other characters, means for bodily displacing the illuminated area along a line containing further characters to illuminate the characters of said line successively, means for forming images adjacent a common point of the characters strung out along said line, means adjacent said common point for splitting up said images each into two parts and for directing the rays of said two parts of each image in two different general directions, and means for comparing each of said parts with all characters in use.

2. Optical scanning arrangement according to claim 1, wherein means are provided for stepwise displacement of the illuminated area from character to character.

3. Optical scanning arrangement for scanning characters of a record along a straight scanning line, comprising a source of light, means for directing light outwardly from said source to illuminate a record area of restricted width confined to a single character, a concave mirror disposed in the path of light to focus the light on said record area, means for changing the outward direction of the light rays to displace said lighted area along said straight scanning line to successively scan the characters at said line, means for forming the successive images of the lighted area adjacent a point common to all area positions along said line, and means responsive to the light images for transmitting electric impulses.

4. Optical scanning arrangement according to claim 3, wherein the means for directing light outwardly and for changing its outward direction is a rotor, and wherein the mirror has a reflecting surface of circular profile in a plane perpendicular to the rotor axis, the radius of said profile being double the distance of the rotor axis from said mirror surface.

5. Optical scanning arrangement according to claim 3, wherein the means for directing light outwardly and for changing its outward direction is a rotor, and wherein the straight scanning line lies between the rotor axis and said mirror.

6. Optical scanning arrangement according to claim 5, wherein the distance between the scanning line and the rotor axis is one third of the distance between the rotor axis and the mirror surface.

7. Optical scanning arrangement for scanning characters of a record, comprising a source of radiant energy, means for directing radiation therefrom to a record for illuminating the whole area of a single character while confining the radiation to said character, means for bodily displacing the illuminated area along a scanning line that contains further characters to successively scan the characters at said line, a stationary individual lens surface for each character position along said line, means additional to said lens surfaces to therewith form images of said characters adjacent a common point, and means for comparing said images with all the characters in use.

8. Optical scanning arrangement according to claim 7, wherein said individual lens surface has a height larger than its width, the width being measured in the direction of the scanning line.

9. Optical scanning arrangement according to claim 7, wherein said individual lens surfaces are parallel cylindrical surfaces, being straight in a direction perpendicular to the scanning line.

10. An optical scanning arrangement for scanning characters arranged in a line on a record, said arrangement comprising means for illuminating a record area of restricted width embracing the entire height of a character without infringing other characters on the record, means for bodily displacing the illuminated area along said line to illuminate areas along the length of said line successively, means for forming images adjacent a common point of the successively illuminated areas of said line, means adjacent said common point for splitting up said images each into two parts and for directing the rays of said two parts in different general directions, and photocell means disposed to be responsive to the two parts of said rays for transmitting electric impulses.

11. An optical scanning arrangement according to claim 19, wherein the means for displacing the illuminated area is a rotor containing a plurality of lenses at equal distances from the rotor axis, and the means for illuminating the record area is a source of light placed to transmit light outwardly through said lenses.